QUANTIZED HYPERBOLIC NAVIGATION AND COMMUNICATION SYSTEM

Filed May 19, 1960 5 Sheets-Sheet 1

LEE D. SMITH
ALBERT S. FULTON
INVENTORS

BY George C. Thompson Jr. agent
Morris Spector
ATTORNEY

LEE D. SMITH
ALBERT S. FULTON
INVENTORS

BY George C. Thompson, agent
Morris Spector
ATTORNEY

QUANTIZED HYPERBOLIC NAVIGATION AND COMMUNICATION SYSTEM

Filed May 19, 1960 5 Sheets-Sheet 3

LEE D. SMITH
ALBERT S. FULTON
INVENTORS

BY George C. Thompson, agent
Morris Spector,
ATTORNEY

QUANTIZED HYPERBOLIC NAVIGATION AND COMMUNICATION SYSTEM

Filed May 19, 1960 5 Sheets-Sheet 4

LEE D. SMITH
ALBERT S. FULTON
INVENTORS

BY George C. Thompson [signature], agent
Morris Spector [signature],
ATTORNEY

QUANTIZED HYPERBOLIC NAVIGATION AND COMMUNICATION SYSTEM

Filed May 19, 1960 5 Sheets-Sheet 5

LEE D. SMITH
ALBERT S. FULTON
INVENTORS

BY George C. Thompson by agent
Morris Spector
ATTORNEY

United States Patent Office 3,263,231
Patented July 26, 1966

3,263,231
QUANTIZED HYPERBOLIC NAVIGATION AND COMMUNICATION SYSTEM

Lee D. Smith, Northridge, and Albert S. Fulton, Thousand Oaks, Calif., assignors to Thompson Ramo Wooldridge Inc., Canoga Park, Calif., a corporation of Ohio
Filed May 19, 1960, Ser. No. 30,170
20 Claims. (Cl. 343—105)

This invention relates to a quantized hyperbolic navigation and communication system and more particularly to a system utilizing a plurality of ground transmitting stations cooperating to provide time determined hyperbolic lines of position for receiver orientation as well as communications reception in a selected area.

Many systems have been devised for providing receiver capability for location of an aircraft or ship through received signals and proper interpretation. However, in addition to the prior known navigation systems, it has been necessary to provide general omnidirectional communication signals capable of being received by all aircraft within range of the station. Some proposed communication systems have made use of directional antennas for providing transmission into a selected area. However, transmission of communication signals to only one particular location within an area has not heretofore been utilized.

It is, therefore, an object of this invention to provide a combined navigation and communication system.

It is another object of this invention to provide a navigation and communication system requiring relatively simple airborne receiver equipment.

It is another object of this invention to provide a system capable of reducing the possibilities of communications and navigation jamming.

It is still another object of this invention to provide a navigation and communications system capable of receiving communication signals only in one small selected area.

It is another object of this invention to provide a navigation system capable of increased navigation position accuracy.

It is another object of this invention to provide a receiver capable of variable signal delay for obtaining exact signal correlation.

It is still another object of this invention to provide communications reception by selected receiver types in selected areas only.

Other objects, purposes and characteristic features will become obvious as the description of the invention progresses.

In practicing this invention, there is provided a master and two slave stations transmitting signals in key relationship with each station providing a primary signal and a plurality of subsequently transmitted delayed signals. The transmitted signals of the stations cooperate to provide hyperbolic lines of position detected by correlation receivers, the received signals being displayed as the coordinates of the position held by the receiver at this time. In addition, by providing modulation of the proper time delayed signal, communication signals are capable of being transmitted to only one location where the hyperbolic lines formed by the three transmitters having the proper delays intersect.

Figures 7, 8A:
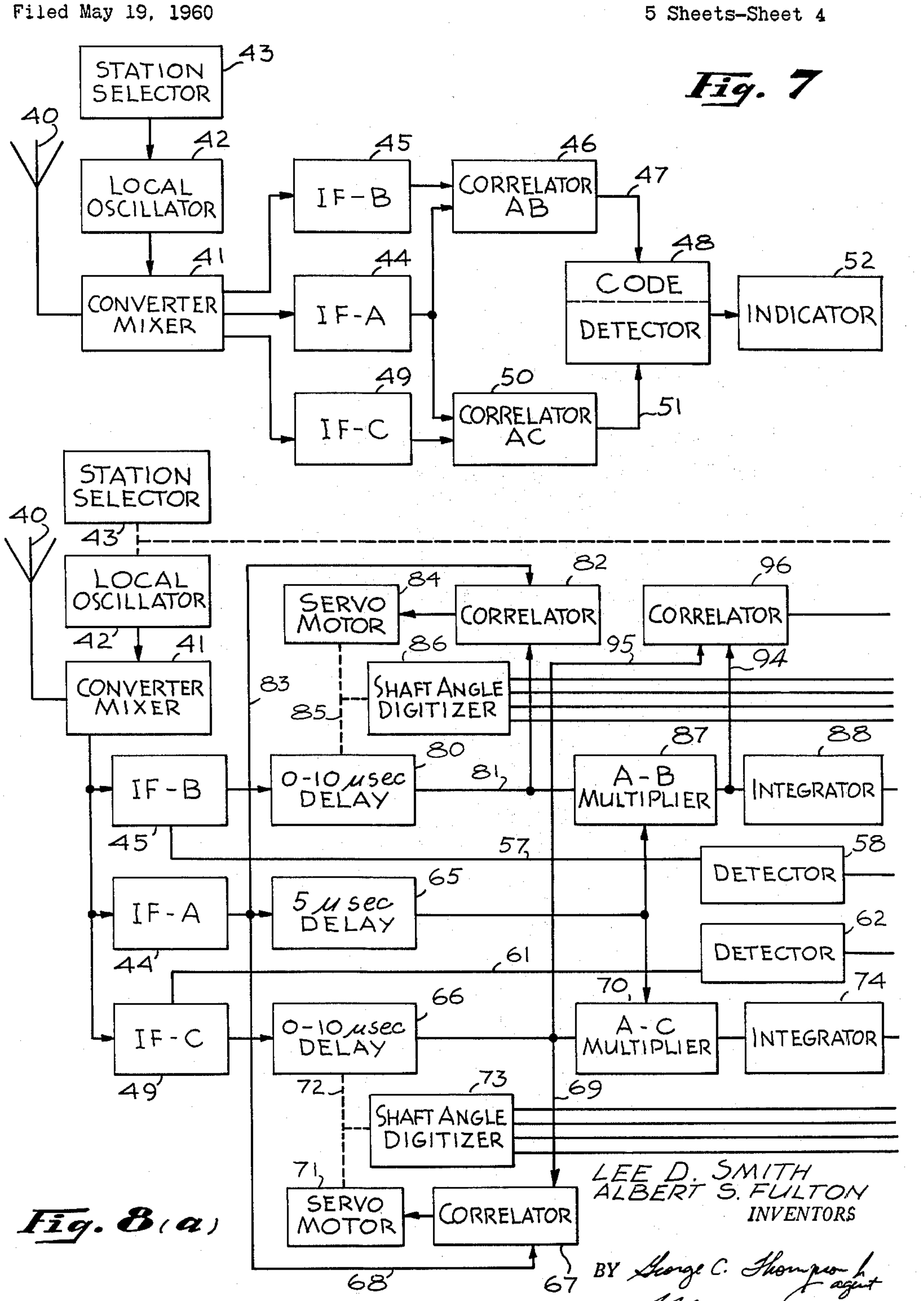
FIGURE 7 is a view illustrating one typical receiver capable of receiving position indications from the three stations.
Figure 8B:
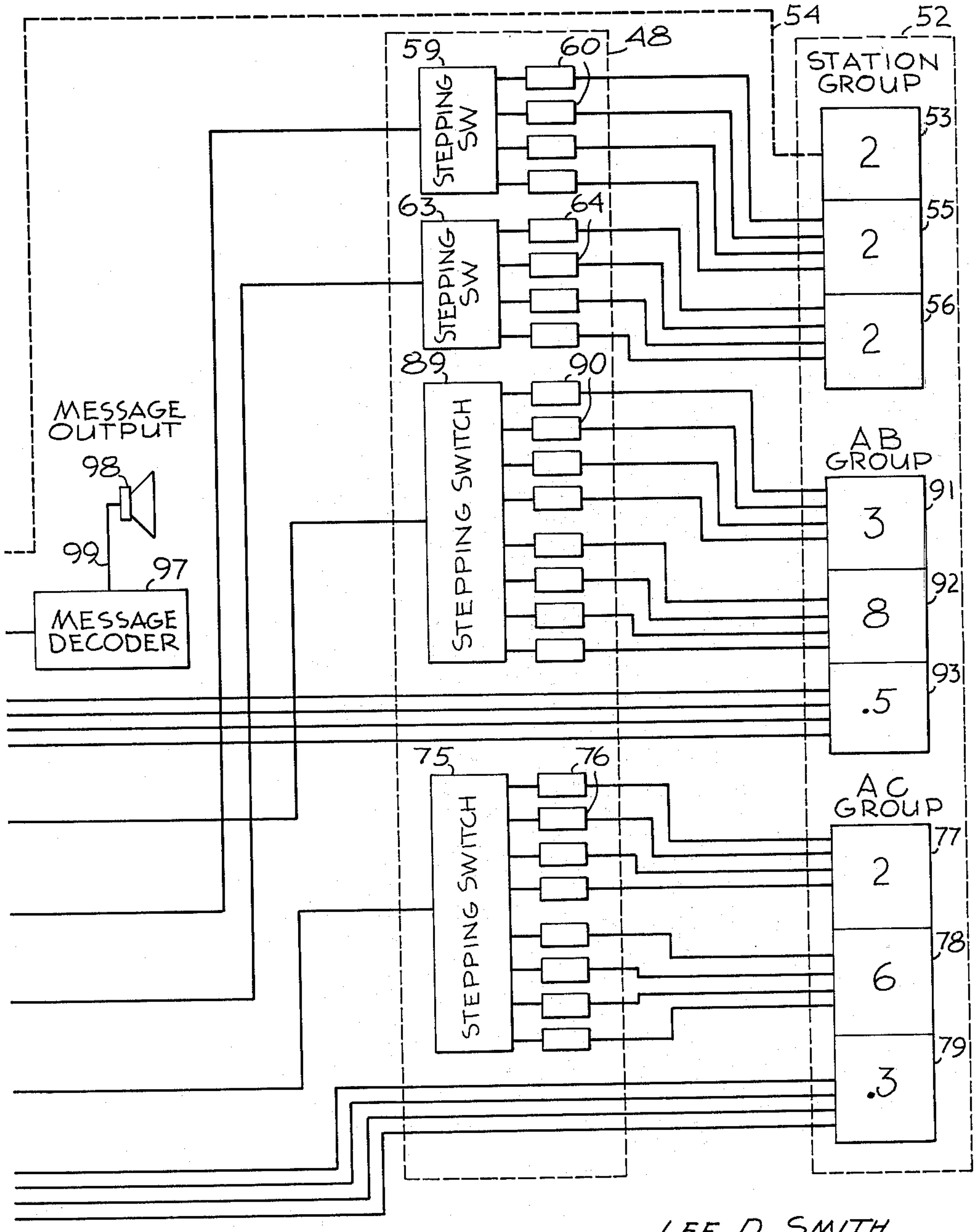

FIGURES 8(*a*) and 8(*b*) illustrate a receiver capable of communication reception as well as position indication.

Figure 9:
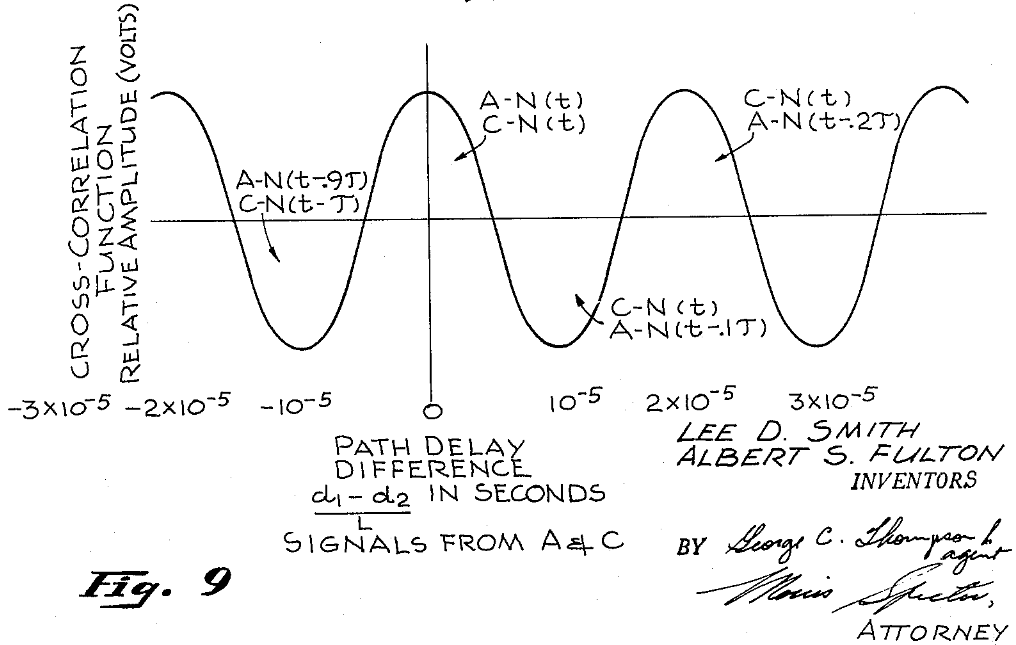

FIGURE 9 is a curve illustrating how the signals received by receiver of FIGURES 8(*a*) and 8(*b*) may be shifted to provide the best correlation.

In each of the several views similar parts bear like reference characters.

Figure 1:
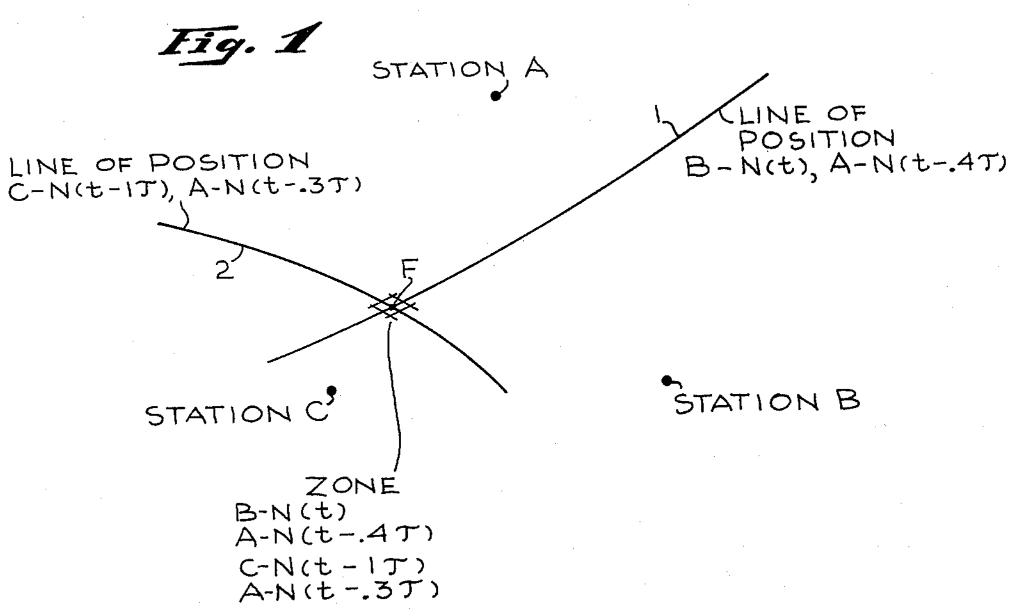
FIGURE 1 is a diagrammatic view representing the three stations and a representation of a typical family of curves showing the hyperbolic lines of position developed between station transmitters.

The three stations A, B and C illustrated as triangularly positioned in FIGURE 1 should be placed at spaced apart intervals forming any suitable length triangle sides capable of good coverage of the area therebetween at the frequency used.

The three stations A, B and C are placed to form a triangle with the stations located at the vertices of the triangle. Positioned at each of the stations, is a prerecorded signal of random waveform, hereinafter referred to as noise signal, with each prerecorded signal being identical with each of the other signals. The noise signal may be referred to as $N(t)$ with each noise signal at each station being identified by a code indicated as a prefix on its respective noise record $N(t)$. For example, the noise signal at station A would be known as $AN(t)$, at station B the signal would be $BN(t)$ and at station C the signal would be $CN(t)$. The method of storing the noise signal at each of the stations may take any form such as a magnetic tape or drum or may be precisely generated at each of the stations.

Figures 2, 3:
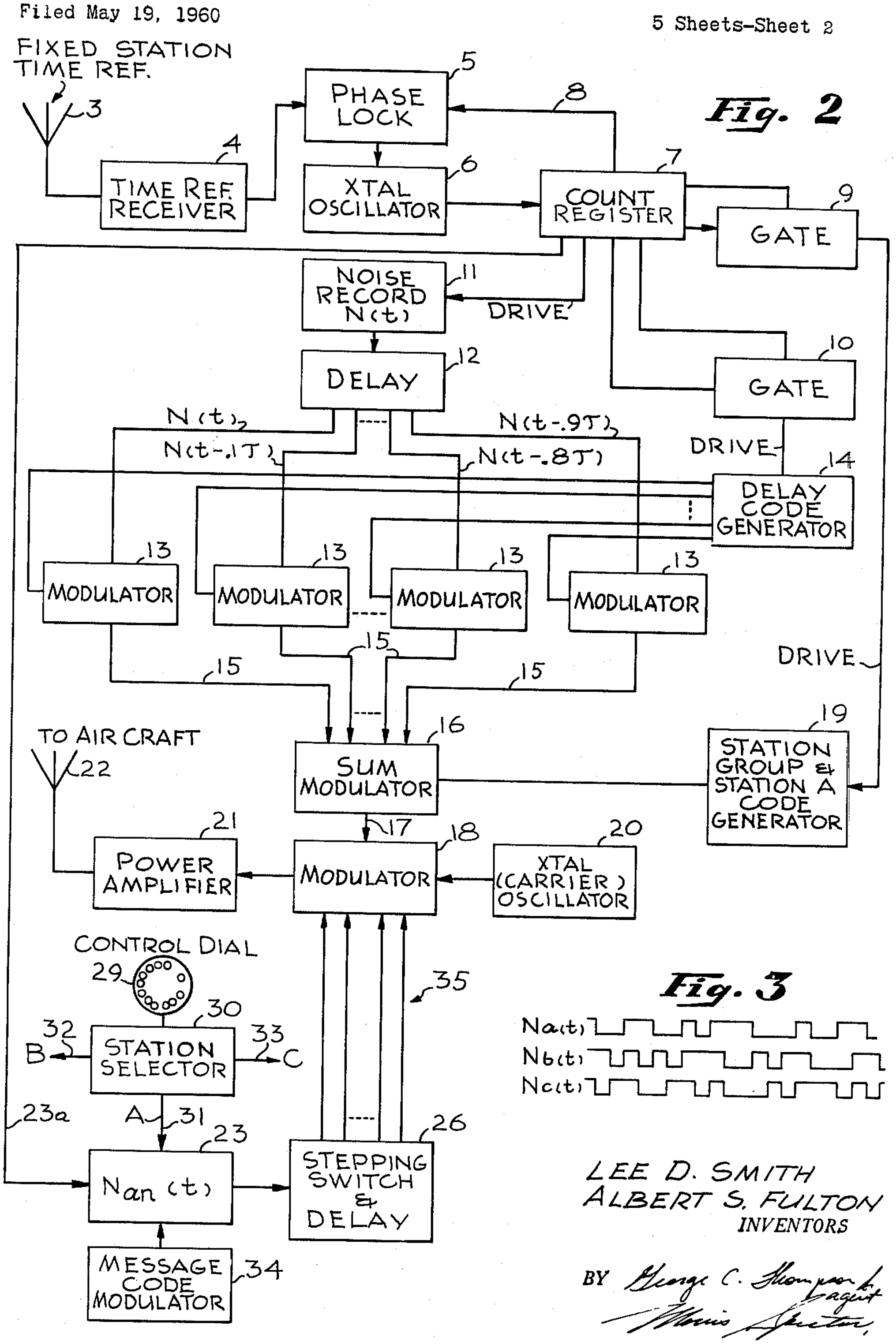
FIGURE 2 is a diagrammatic illustration of one of the transmitting stations showing the navigation modulation and communications modulation.
FIGURE 3 is a view illustrating a family of waveforms typical of those necessary to carry the communication message to a location from the three stations.

As will be explained hereinafter in connection with a discussion of FIGURE 2, showing station A, the noise waveform modulates a radio frequency carrier which has a different frequency for each station and the modulated carriers are transmitted from each station successively with a fixed delay between each successive transmission. For example, in the case of station A, ten signals are transmitted continuously with a slight delay occurring between subsequent transmitted signals. The amount of delay appearing between the originally transmitted signal $AN(t)$ and the next transmitted signal can be represented as a $-.1\tau$. The signal as delayed can, therefore, be represented as $AN(t-.1\tau)$. Subsequent signals will be identical with the originally transmitted signal except for the delay period and identification modulation explained hereinafter, with the next successive delay being represented as $AN(t-.2\tau)$. Subsequent delays can generally be indicated as $AN(t-.n\tau)$.

Since the same signal (except for identifying code) is transmitted from stations A, B and C, with the initial signals being simultaneously transmitted from all three stations, it is obvious that the initial signal from station B can be indicated by $BN(t)$, and the initial signal from station C indicated as $CN(t)$. Since the random modulating signals are identical, the transmitting stations are identified by carrier frequency assignment with large area coverage requiring the use of more than one station on a frequency. It is, therefore, necessary to provide each of the signals with a station code identifying the station of origination. In addition, maximum signal correlation product occurs at multiple locations corresponding to the multiple signal delays, hence it is necessary to identify each of the delays with an identifying delay code which is different for each delay. A correlation signal product output can be defined as having a magnitude which is directly related to the degree to which the mutually coherent components of the signals are in time coincidence. With the contiguous transmission of a sequence of signals, each only slightly delayed, such as represented by the .1$\tau$ delay between each delay signal transmitted from station A, relatively accurate position determination can be made by transmitting delay signals from stations B and C at periods such as ten times the delay used with station A. With this arrangement, station A will transmit its original signal, at the same time stations B and C transmit their original signals, with station A transmitting a sequence of nine delay signals before stations B and C transmit their second delay signals. Since the signals transmitted from station A are continuously transmitted, it can be seen that these signals will lie closely spaced in time as compared with the signals transmitted from stations B and C.

If we refer now to FIGURE 1, a typical representation of a family of hyperbolic lines and positions provided by the three stations and their delayed transmitted signals is represented. The cooperating signals between the master station A and the slave station B provides a family of hyperbolic lines of position such as that illustrated by the line 1 while the cooperation of the master station A with the slave station C establishes hyperbolic lines of position illustrated by the hyperbolic line 2. If a receiver is located within the area between the three stations, and tuned to the three stations, the receiver would receive each of the delay signals transmitted. However, families of delay signals from stations A and B received by the receiver will only have certain ones which will be coherent or provide substantially maximum signal product output upon signal correlation therebetween. As an example of signal correlation techniques, reference is made to the publication on Signal Correlation, Office of Naval Research, Technical Report No. 144 by R. A. Johnson of Craft Laboratory, Harvard University, Cambridge, Massachusetts, March 25, 1952, entitled "An Analog Computer for Correlation Functions in Communication Systems." As will be explained hereinafter, the receiver functions on only signals which provide substantially maximum signal product upon correlation of two signals. The receiver further receives signals from stations A and C with only two of the families of delay signals coinciding in time of reception for providing a maximum in correlation output. The two correlated signals, of the cooperating stations A and B and A and C, provide signal information by which the receiver can determine its position. Typical examples of delay signals cooperating to provide receiver position is illustrated in FIGURE 1 for the point F. In this typical illustration, the hyperbolic line established by the signal correlation of delay signals $AN(t-.4\tau)$ and $BN(t)$ crosses the hyperbolic line of position represented by the correlation delay signals $AN(t-.3\tau)$ and $CN(t-1\tau)$.

Figure 6:
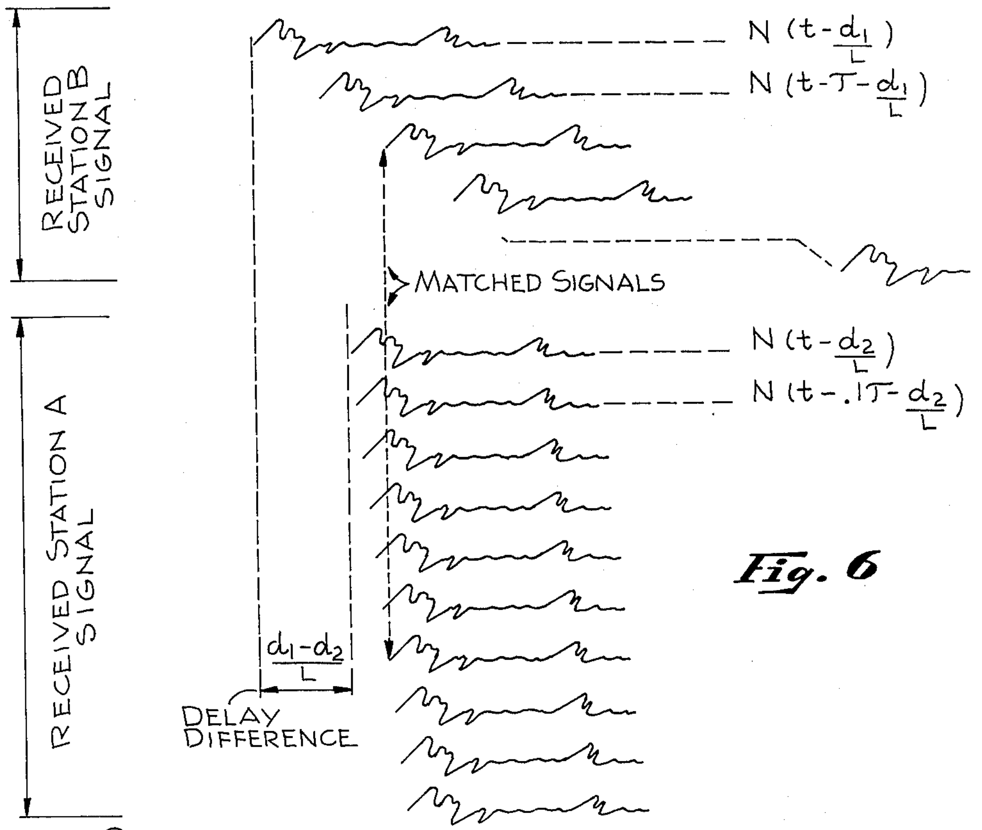
FIGURE 6 shows typical receiver presented families of waveforms from two stations, with each family having noise signals of different time delays as is found in the transmission from each transmitter station.

The curves of FIGURE 6 illustrate the receiver reception of typical transmissions of stations A and B in which the Station A is transmitting signals at a repetition delay rate of $.n\tau$. It can be seen that for the receiver position shown, substantial maximum signal correlation would occur at the third time delay signal .3$\tau$ of station B and the seventh .7$\tau$ signal of station A. These transmissions would be at maximum correlation on the hyperbolic line of position resulting from a transmission delay difference between stations A and stations B of $$\frac{d1-d2}{L}$$

where $d1$ is the particular distance of transmission of station B and $d2$ is the particular distance of transmission of station A and L is the speed of light. Up to this point, explanation has been made showing how similar signals transmitted from three stations at different time periods can provide a position determination when correlation occurs among certain of the delay transmitted signals. It is next necessary to provide a means of determining which delay signal is being received from each station. This identification is provided by a code transmitted by each station along with each signal as will be shown hereinafter.

If we now consider a typical station such as shown in FIGURE 2, the operation of this station will be set forth. Since it is absolutely necessary that each of the stations A, B and C be synchronized, a time reference signal antenna 3 is provided for each station for receiving standard time signals continuously broadcast for time reference purposes. The signal received by the antenna 3 is processed by the time reference receiver 4 and applied to the phase lock circuit 5 for application to the crystal oscillator 6 controlling the counting register 7. The phase lock circuit 5 can be of any well known type capable of receiving a feedback through the circuit path 8 from the counting register 7 for assuring lock-in of the crystal oscillator 6 on the time signal received by the receiver 4.

The counting register 7 supplies count pulses for a plurality of controlled gates 9 and 10 as well as a drive for a common noise record 11. Since it is necessary to transmit the same noise record at a plurality of different delay periods a delay circuit 12 is connected to the noise record circuit 11 to provide certain time delay periods for application of the noise record to the modulators 13.

In addition to the noise record input to each of the modulators 13, there is provided an identification code input to each of the modulators 13 from a code generator 14. The code generator is activated by an input from the gate 10 in response to the register 7 activation by the receiver 4. The generator provides the identification to each modulator 13 in the proper time delay with a different code for each time delay.

The inputs to the modulators 13 are combined and presented in output circuits 15 to a summation modulator 16 capable of providing a composite output signal, over its output circuit 17, to a master modulator 18. A station code generator 19 provides a station code identification. The station code generator 19 is activated by the gate circuit 9 in response to the register 7 and receiver 4 to apply the station code at the proper time to the summation modulator 16.

Since the information received from the summation modulator 16 is not capable of space radiation, a suitable crystal-controlled RF generator 20 is provided as a carrier for the information received by the modulator 18 from the summation modulator 16. The now modulated and identified crystal-controlled frequency is amplified by the power amplifier 21 and transmitted into space by the antenna 22. The signals being generated by this station as described hereinbefore are for the purpose of providing navigation information to aircraft within the area intended to be covered by this system. In addition to navigation facilities, the station can also provide communication facilities with communication signals being received only by selected aircraft within a selected zone.

Figure 4:
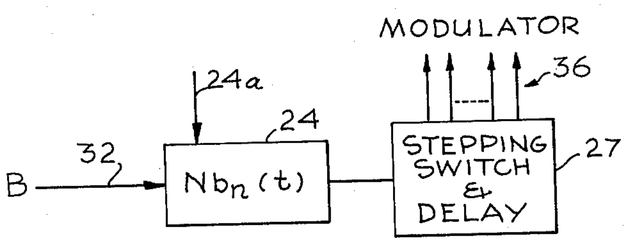
FIGURE 4 illustrates the communications modulation portion of the transmitter of a different station from that of FIGURE 2.
Figure 5:
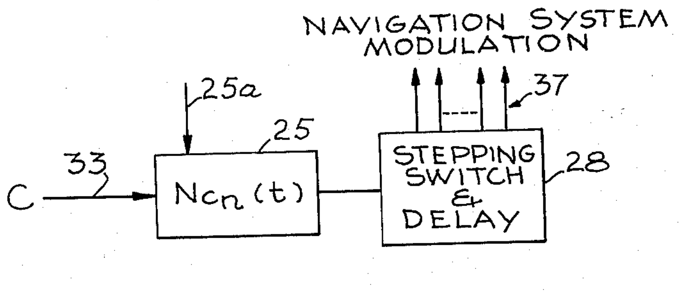
FIGURE 5 is a schematic illustration of the communications modulation needed for a still different station.

In order to provide a communication system capable of transmission to a selected zone only, it is necessary to provide the three stations A, B and C with additional noise records $Na(t)$, $Nb(t)$ and $Nc(t)$ each of which or any two of which when multiplied together and averaged results in a zero output $Na(t)\times Nb(t)=0$; $Nb(t)\times Nc(t)=0$ and $Nc(t)\times Na(t)=0$. However, when the third one is multiplied with the product of the other two an energy level above or below zero occurs $Na(t)=Nt(t)\times Nc(t)$. Such a noise pattern is illustrated in FIGURE 3 and is established in each of the transmitters by the noise record generators 23, 24 and 25 (see FIGURES 2, 4 and 5). In the codes of FIGURE 3, for example, the product of codes $Na(t)$ and $Nb(t)$ equals $Nc(t)$, hence, the product of $$Na(t)\times Nb(t)\times Nc(t)$$

is a constant value above or below zero. The modulation may take the form of polarity reversals of $Na(t)$ thereby causing polarity reversals in the product $$Na(t)\times Nb(t)\times Nc(t)$$

at a modulation rate. In order to provide for correlation of these signals in the proper area, it is necessary to select the proper time delays in the transmission of the noise record from each of the stations. For this purpose the count register 7 is connected to the noise record generator by the circuit path 23*a* to synchronize the noise record to the time reference signal. Likewise, the record generators 24 and 25 are connected to the count register by the circuits 24*a* and 25*a*. The addition of the proper delay periods for each is provided by the stepping switch and delay lines 26, 27 and 28 in stations A, B and C respectively. Since the selection of the proper delay is made from one location, for example, station A, it is necessary to provide a means for an operator at station A to select the proper delay at each of the stations A, B and C. Any method may be used such as for example, a telephone type dial 29 controlling a station selector 30 and each of the stepping switches 26 through 28. For example, the dial could be dialed for the first digit to select the line 31 for station A. The second digit would select the proper time delay for the stepping switch 26 and initiate the code generator 23. The third and fourth digits selected by the dial 29 would select the line 32 to station B and the proper time delay in the stepping switch 27 for station B. Likewise, the fifth and sixth digits would select the line 33 to station C for activating the noise generator 25 and selecting the proper time delay in the stepping switch 28. When the proper delay periods have been selected one of the noise generators such as the generator 23 of station A is modulated by the message code modulator 34. It is pointed out that the modulation applied to the noise code generator is of relatively low frequency compared to the noise generator signal thus causing little effect in the noise signal correlation action taken by the receiver. The stepping switch 26 in the case of station A provides the modulator 18 with the modulated and delayed noise signal over one of the input paths 35. The modulator 18, in turn, modulates the carrier frequency from the oscillator 20 to provide a signal for the power amplifier 21 and transmitting antenna 22. Likewise stations B and C provide their delayed unmodulated noise generated signals to the station modulators (not shown) over the conductors 36 and 37 respectively, as the signals are received from the stepping switches 27 and 28 respectively.

The transmitter portion of this system has now been described showing how the signals may be propagated for navigation purposes and, in addition, a provision for communications is included. It is pointed out that although it is desirable to have the communications operate during a period when the navigation portion is inactive, this diversity is not necessary. It is possible to have navigation and communication functions taking place simultaneously. Since correlators are used for signal separation, the intermixing of navigation and communication signals does not affect the function of each individually. Since the communication system is effectively for transmission of signals to a particular area, it is necessary for the operator to know the location of the aircraft he wishes to contact, or the communications link may be merely the placement of information into a locality for the consumption of any aircraft having this receiver system and located in the area. The exclusion of the communication signals from all areas except the desired area will be more fully explained in connection with the receiver. It should be pointed out, however, that one of the major advantages of the system is the fact that the receiver does not have to compute its position from the signals received since the position is automatically indicated by code attached to each delay signal.

Two receivers are shown in FIGURES 7 and 8(*a*) and 8(*b*), each capable of satisfactory operation with greater accuracy being provided by the receiver of FIGURE 8(*a*) and 8(*b*). The receiver of FIGURE 7 is provided with an antenna 40 capable of receiving the signals from the three stations A, B and C and providing the signals as an input to a converter mixer 41 which is also receiving signals from a local oscillator 42 which is tunable by a station selector 43. This combination provides an output at a fixed IF frequency for each of the stations A, B and C with each being at a different intermediate frequency. The signals from A and B for example are amplified by the IF amplifier 44 and 45 respectively, and supplied to a suitable correlator 46 capable of producing an output when the signals applied to it have mutually coherent components which are in time coincidence. The signals, when correlation takes place, result in an output on the output circuit 47 for input to the code detector 48. At the same time that this function is taking place the signal of station C is also amplified by an intermediate frequency amplifier 49 with the IF frequencies of A and C being supplied to a correlator 50 to provide a product output on the output signal circuit 51 when the signals applied to it have mutually coherent components which are in time coincidence, also, for input to the code detector 48. Since each of the signals carries a modulation code identifier that indicates the amount of delay at which the signal is transmitted from each of the stations, the code detector merely identifies the code of each of the signals and in response thereto establishes which of the crossed hyperbolic lines is being received by the receiver. When the determination is made, the indicator 52 displays an indication of the position held by the aircraft at this time. Any suitable code detector and display may be used and in the description of the receiver if FIGURE 8(*a*) and 8(*b*), a specific suitable type is described in detail.

The receiver of FIGURE 8(*a*) and 8(*b*) is identical with receiver of FIGURE 7 up through the intermediate frequency amplification of the amplifiers 44, 45 and 49. The receiver of FIGURE 8(*a*) and 8(*b*), however, from this point on differs in its arrangement to the extent of being able to provide position indications that change in smaller lines of position between adjacent areas.

In order to cause the display device to given an indication of the receiver position, it is necessary to provide an indication of the stations selected. For this purpose, a station group display is provided with one identifying digit 53 mechanically tuned through a mechanical link by the station selector 43. Since it is necessary to also determine whether the selector is also properly tuned for stations B and C the display devices 55 and 56 are provided which are operative to provide a display upon the reception of any signals through the IF amplifiers B and C. To provide this capability, the coded signal of the IF amplifier 45 received from station B is delivered over the output circuit path 57, detected by a suitable detector 58 and used to pulse code a stepping switch 59 for the purpose of controlling suitable multivibrators 60 to provide a coded combination of "ones" and "zeros" for controlling the display device 55. With the multivibrators 60 each having two conditions either on or off (ones and zeros), it is possible to provide sixteen display indications in the display device 55. In the present system disclosed, however, it is only necessary to provied ten indications since diversity of stations on the same frequency can be provided by a distance therebetween. In a similar manner, station coded signals received from station C and passed through the IF amplifier 49 are delivered through the output circuit 61 to a suitable detector 62 to control the stepping switch 63 to condition suitable multivibrators 64 for control of the indicator display device 56.

In order to provide the smaller hyperbolic lines of location information after station selection, the master station A intermediate frequency (after being amplified by the IF amplifier 44) is provided with a fixed 5 microsecond delay by the delay line or device 65. By providing a 5 microsecond delay for the signal A, the signal C can vary plus or minus 5 microseconds in its output from a 0 to 10 microsecond delay device 66 in order to exactly correlate with the signal output from the delay device 65. Since the delay device 66 is variable from 0 to 10 microseconds, it is necessary to provide a means for shifting the delay in response to exact correlation of the two signals. This is accomplished through a correlator 67 which is provided with an input from the station A IF amplifier 44 over the input circuit 68 and a second input from the output circuit of the station C zero to 10 microsecond delay device 66 received over the input circuit path 69. The signals from the two delay devices 65 and 66 are, in turn, supplied to a station A–C multiplier 70. With the correlator 67 receiving signals from the IF amplifier 49 which have been passed through the variable delay device 66, and at the same time receiving station A signals directly from the IF amplifier 44, a comparison of these two signals for zero (out of phase) correlation is provided. The output of the correlator 67 is then used to control a servo motor 71 to drive a suitable shaft 72 to vary the amount of delay provided in a delay device 66 which in turn adjusts its output to the correlator 67 and A–C multiplier 70 until exact zero correlation occurs between the output of the delay device 66 and the output of the IF amplifier 44. If the signals produced by the IF amplifiers 44 and 49 exactly correlate before variable delay adjustment, the delay device 66 would provide a 5 microsecond delay to correspond to the delay of the device 65. If the signals are displaced a small amount from the 5 microseconds delay provided by the delay device 65, the correlator 67 causes the delay device 66 to make a corresponding adjustment to cause the outputs of the delay devices 65 and 66 to exactly coincide (in phase) for maximum correlation. The amount of adjustment necessary to shift the delay device 66 to coincide with the signal output of the delay device 65 is then indicated by a suitable shaft angle digitizer 73 of any suitable well-known type connected to the shaft 72 for rotation therewith. The adjusted output of the delay device 66 is then presented to the A–C multiplier 70 along with the signal from the 5 microsecond delay device 65. The signals are then multiplied and supplied to a smoothing integrator 74 for delivery to a portion of the decoder 48 used to control the indicator 52. The operation of the multiplier 70 and integrator 74 results in a correlation signal between stations A and C that is in exact correlation even though the signals may have been slightly displaced before shifting by the delay device 66. The added receiver delay is then indicated in another portion of the indicator giving more accurate information as will be explained hereinafter. The correlation of two signals received from stations A and C, each of which carries its own identification code, results in an output from the integrator 74 which rises and falls at the identifying code rate of the particular coded delay signals of the two stations. The identifying codes then pulse a suitable stepping switch 75 connected to the integrator 74 to control each of a plurality of multivibrators 76 connected thereto to be either on or off in the code selected combinations. It is again emphasized that the codes from the master and slave stations are so sequenced that the station A codes are received and processed before the station C codes. The selected combination on the multivibrators 76 provide coordinate output information in the A–C display devices 77 and 78 respectively, indicating the hyperbolic line of position along which the receiver can only be positioned between the stations A and C. Since this information is digitally displayed, it is obvious that discrete steps only can be displayed in the hyperbolic lines of location. In view of this fact the shift of the signals by the delay circuits 65 and 66 to cause exact correlation is then detected by the shaft angle digitizer 73 (as discussed before) and supplied to display device 79 to show smaller interpolation of the relationship between the hyperbolic lines of position.

The curve of FIGURE 9 represents graphically the cross-correlation of the waveforms of the stations A and C. For example, at delay difference zero (0) the signals AN($t$) and CN($t$) exactly correlate, at delay difference $-10^{-5}$ seconds the delay signals AN($t-.9\tau$) and CN($t-1\tau$) exactly correlate. The receiver control adjustment positioning the shaft angle digitizer allows one of the two received signals to be shifted relative to the other by plus or minus 5 microseconds to allow exact correlation of the signals to occur, otherwise exact correlation would only occur when the receiver is positioned at correlation peak locations such as occurs at cross correlation time zero.

In order to complete the position information, it is necessary to provide a cooperating hyperbolic line of position through the use of the master station A and its cooperating slave station B. This is accomplished through a second 0 to 10 microsecond variable delay device 80 which is connected to the station B IF amplifier 45 to provide an output on its output circuit 81 which is delivered to a suitable correlator 82 which is also receiving another input from the station A IF amplifier 44 over the circuit 83. The two input signals are compared and used to control the servo motor 84 which is capable of positioning the shaft 85 connected to the 0 to 10 microsecond delay 80 for causing the delay of the device 80 to be shifted. The exact amount of shift presented by the delay device 80 is then detected by a shaft angle digitizer 86 controlled by the shaft 85. The output of the delay device 80 is also connected to a suitable multiplier 87, which is also receiving an input from the 5 microsecond delay device 65 for station A signals. The two input signals are multiplied by the device 87 with the multiplied signal then smoothed by an integrator 88 which has its output connected to a suitable stepping switch 89. The codes associated with the delay signal of station B and the delay signal of station A are then used to step the stepping switch 89 after the correaltion has taken place by the devices 87 and 88. The stepping switch 89 conditions suitable multivibrators 90 to establish the proper display indications of devices 91 and 92. The display devices 91 and 92 provide the initial coarse reference of the hyperbolic line of location closest to the receiver. In order to determine a more accurate hyperbolic location, the output of the shaft angle digitizer 86 is used to control the display 93 to indicate the amount of variable delay that is necessary to exactly provide correlation between the two signals from stations A and B. This indication provides fine adjustment of the hyperbolic line along which the receiver is located. In order to use the information displayed, it is only necesary to determine the two hyperbolic lines indicated by the coordinates set forth in the display for the A–B and A–C groups on a chart and note where these lines cross, thus denoting the location.

Since it is only necessary to use a very small fraction of the time of receiver activation for the purpose of providing navigation information, the receiver can also be used for message reception within a specified locality only. As previously pointed out, if the message modulation is placed on the proper time delay signals, the message will appear as modulation on the proper correlation function at the selected locality. In order to obtain intelligence from the message modulation placed on the master station A signal, it is necessary to correlate the signals from all three stations. For this purpose, the multiplier 87 is used to multiply the outputs of stations A and B to produce a combined output on the circuit 94. To complete the correlation function, it is then only necessary to receive the output of the delay device 66 containing the output of station C from the IF amplifier 49 and provide this delay signal through the circuit path 95 to a suitable correlator 96. If the correlator receives inputs from station C and the product of signals from stations A and B, its correlation operation will produce an output signal having an envelope intelligence, if the message is placed on the proper delay noise record for this receiver location. The output of the correlator 96 is then delivered to a message decoder 97 or detector of any suitable well-known type which provides an output to a display or an aural device 98 through the output circuit path 99. The message decoder may take the form of a detecting device, an audio amplifier or may take the form of a stepping switch providing a decoding of the incoming pulses for the purpose of initiating operation of a selected one of prerecorded messages carried by the receiver. The actual method of message decoding is not shown since this does not form any specific part of this invention.

While there has been described what is at present considered a preferred embodiment of the invention, it will be obvious to those skilled in the art that various changes and modifications may be made therein without departing from the invention, and it is aimed in the appended claims to cover all such changes and modifications as fall within the true spirit and scope of the invention.

What is claimed is:

1. A system for providing vehicle control information comprising: a plurality of transmitting stations; radiating means for each of said transmitting stations; first control means at each station for generating waves representing a plurality of substantially identical mutually coherent signals time displaced from each other; identification code modulating means for providing a distinctive identification modulation on each signal from each station; second control means for energizing each of said radiating means with said plurality of modulated signals; receiver means; correlation means in said receiver means; said correlation means providing comparison of said signals from selected ones of each of said stations to determine which of said signals most nearly correlate; and decoding means for identifying the distinctive code modulation of the most nearly correlated signals.

2. A system for providing vehicle control information comprising: a plurality of transmitting stations; radiating means for each of said transmitting stations; first control means at each station for generating waves representing a plurality of substantially identical signals time displaced from each other; identification code modulating means for providing a distinctive identification modulation on each signal from each station; second control means for energizing each of said radiating means with said plurality of modulated signals; receiver means; correlation means in said receiver means; said correlation means providing comparison of said signals from selected ones of each of said stations to determine which of said signals most nearly correlate; decoding means for identifying the distinctive code modulation of the most nearly correlated signals; and display means responsive to each distinctive code of the most nearly correlated signals for indicating the information carried thereby.

3. A system for providing vehicle control information comprising: a plurality of transmitting stations; radiating means for each of said transmitting stations; first control means at each station for generating waves representing a plurality of substantially identical mutually coherent signals time displaced from each other; identification code modulating means for providing a distinctive identification modulation on each signal from each station; second control means for energizing each of said radiating means with said plurality of modulated signals; receiver means; correlation means in said receiver means; said correlation means providing comparison of said signals from selected ones of each of said stations to determine which of said signals most nearly correlate; decoding means for identifying the distinctive code modulation of the most nearly correlated signals; and variable random signal delay means in said receiver for delaying one signal with respect to its correlating signal to provide substantially full signal correlation.

4. A system for providing vehicle control information comprising: a plurality of transmitting stations; radiating means for each of said transmitting stations; first control means at each station for generating waves representing a plurality of substantially identical mutually coherent signals time displaced from each other; identification code modulating means for providing a distinctive identification modulation on each signal from each station; second control means for energizing each of said radiating means with said plurality of modulated signals; receiver means; correlation means in said receiver means; said correlation means providing comparison of said signals from selected ones of each of said stations to determine which of said signals most nearly correlate; decoding means for identifying the distinctive code modulation of the most nearly correlated signals; variable random signal delay means in said receiver for delaying one signal with respect to its correlating signal to provide substantially full signal correlation; display means for indicating each distinctive code carried by each delay signal most nearly correlated; and said display means providing an additional indication indicative of the amount of delay provided by the receiver signal delay means.

5. A system for providing vehicle control information comprising: three transmitting stations disposed in triangular positions with respect to each other; one of said transmitting stations being a master station with the remaining two transmitting stations being slave stations; radiating means for each of said transmitting stations; first control means coupled to said radiating means at each station for generating waves representing a plurality of substantially identical mutually coherent signals for space transmission from each of said radiating means; receiver means; said signal radiated from each of said stations being of a wave shape for providing an output signal from said receiver means when said receiver means is positioned at a location in which correlation of the three signals occurs; and said mutually coherent signal transmitted from each station providing a zero signal at locations in which no signal correlation occurs.

6. A system for providing vehicle control information comprising: three transmitting stations disposed in triangular positions with respect to each other; one of said transmitting stations being a master station with the remaining two transmitting stations being slave stations; radiating means for each of said transmitting stations; first control means coupled to said radiating means at each station for generating a signal for space transmission from each of said radiating means; receiver means; said signal radiated from each of said stations being of a wave shape for providing an output signal from said receiver means when said receiver means is positioned at a location in which substantial correlation of the three signals occurs; said signal transmitted from each station providing a substantially zero signal at locations in which no signal correlation occurs; and said signals providing substantially zero output in the product of any two signals in the absence of the third signal.

7. A system for providing vehicle control information comprising: three transmitting stations disposed in triangular positions with respect to each other; one of said transmitting stations being a master station with the remaining two transmitting stations being slave stations; radiating means for each of said transmitting stations; first control means coupled to said radiating means at each station for generating a signal for space transmission from each said radiating means; receiver means; said signal radiated from each of said stations being of a wave shape for providing an output signal from said receiver means when said receiver means is positioned at a location in which substantial correlation of the three signals occurs; said signal transmitted from each station providing a substantially zero signal at locations in which no signal correlation occurs; and message modulation means at one of said three stations for providing a message modulation on one of said transmitted signals.

8. A system for providing vehicle control information comprising: three transmitting stations; one of said stations being a master station with the remaining two being slave stations; radiating means for each transmitting station; first control means for each station for generating waves representing a plurality of substantially identical mutually coherent signals time displaced from each other; identification code modulating means at each station for providing a distinctive identification modulation on each signal; second control means for energizing each said radiating means with said plurality of modulating signals; receiver means having first and second signal processing sections; correlation means in said receiver means; station selection means for said receiver means; said correlation means being connected to said station selector means to provide signal comparison between the master station and one slave station in the first receiver section, and signal comparison between the master station and the other slave station in the receiver second section; said correlation means providing a comparison of coherent signals in each of said sections to determine which of said coherent signals are in sustantial correlation; and decoding means for identifying the distinctive code modulation of the substantially correlated signals.

9. A system for providing vehicle control information comprising: three transmitting stations disposed in triangular positions with respect to each other; one of said transmitting stations being a master station with the remaining two transmitting stations being slave stations; radiating means for each of said transmitting stations; first means coupled to said radiating means for generating at each station one of a plurality of cooperating signals having mutually coherent components; second means connected to said first means for message modulation of one of said generated signals; third means for selecting the time of transmission for each of said signals for substandial correlation of signal arrival from said three stations at a selected location.

10. A system for providing vehicle control information comprising: three transmitting stations disposed in triangular positions with respect to each other; one of said transmitting stations being a master station with the remaining two transmitting stations being slave stations; radiating means for each of said transmitting stations; first means coupled to said radiating means for generating at each station one of a plurality of cooperating signals having mutually coherent components; second means connected to said first means for intelligence modulation of one of said generated signals; third means for selecting the time of transmission for each of said signals for substantial correlation of signal arrival from said three stations at a selected location; said third means including controllable delay means for each station.

11. A system for providing vehicle control information comprising: three transmitting stations disposed in triangular positions with respect to each other; one of said transmitting stations being a master station with the remaining two transmitting stations being slave stations; radiating means for each of said transmitting stations; first means coupled to said radiating means at each station for generating a different one of three signals $Na(t)$, $Nb(t)$ and $Nc(t)$ each of which is provided with mutual cooperating characteristic properties in which $Na(t)=Nb(t)\times Nc(t)$ when the three are in proper cooperating time relationship.

12. A system for providing vehicle control information comprising: three transmitting stations disposed in triangular positions with respect to each other; one of said transmitting stations being a master station with the remaining two transmitting stations being slave stations; radiating means for each of said transmitting stations; first means coupled to said radiating means at each station for generating a different one of three signals $Na(t)$, $Nb(t)$ and $Nc(t)$ each of which is provided with mutual cooperating characteristics properties in which $Na(t)=Nb(t)\times Nc(t)$ when the three are in proper cooperating time relationship; the average value of any pair, $Na(t)\times Nb(t)=0$ and $Nb(t)\times Nc(t)=0$ and $Nc(t)\times Na(t)=0$ when each pair is in proper time relationship.

13. A system for providing vehicle control information comprising: three transmitting stations disposed in triangular positions with respect to each other; one of said transmitting stations being a master station with the remaining two transmitting stations being slave stations; radiating means for each of said transmitting stations; first means coupled to said radiating means at each station for generating a different one of three signals $Na(t)$, $Nb(t)$ and $Nc(t)$ each of which is provided with mutual cooperating characteristic properties in which $$Na(t)=Nb(t)\times Nc(t)$$

when the three are in proper cooperating time relationship; the average value of any signal pair, $$Na(t)\times Nb(t)=0$$

and $Nb(t)\times Nc(t)=0$ and $Nc(t)\times Na(t)=0$ when each pair is in proper time relationship; and receiver means responsive to said generated and radiated signals only when said signals are in proper time relationship.

14. A system for providing vehicle control information comprising: three transmitting stations disposed in triangular positions with respect to each other; one of said transmitting stations being a master station with the remaining two transmitting stations being slave stations; radiating means for each of said transmitting stations; first means at said transmitting stations coupled to said radiating means for generating three signals $Na(t)$, $Nb(t)$ and $Nc(t)$ having selected cooperating characteristic properties in which $Na(t)=Nb(t)\times Nc(t)$ when the three are in proper cooperating time relationship; the average value of any signal pair, $Na(t)\times Nb(t)=0$ and $Nb(t)\times Nc(t)=0$ *and* $Nc(t)\times Na(t)=0$ when each pair is in proper time relationship; receiver means responsive to said three generated and radiated signals when said signals are in proper time relationship; said receiver means having correlation means responsive to said three signals only when the signals are in proper time relationship.

15. In the system for providing navigation information, a signal propagation means comprising: three transmitting stations disposed in triangular positions with respect to each other; each of said transmitting stations propagating in space waves representing a plurality of substantially identical mutually coherent signals time displaced from each other; one of said stations propagating each of said plurality of signals at one time displaced period with respect to the previously propagated signal; the two remaining transmitting stations each propagating each of their plurality of signals during a different time displaced period from said one station; and identifying code modulating means at each said transmitting stations for providing a distinctive identification modulation on each time displaced signal.

16. In the system for providing navigation information, a signal propagation means comprising: three transmitting stations disposed in triangular positions with respect to each other; each of said transmitting stations propagating in space waves representing a plurality of substantially identical mutually coherent signals time displaced from each other; one of said stations propagating each of said plurality of signals at one time displaced period with respect to the previously propagated signals; the two remaining transmitting stations each propagating each of their plurality of signals during a different time displaced period from said one station; identifying code modulation means at each said transmitting stations for providing a distinctive identification modulation on each time displaced signal; and timing means at each station for coordinating the propagation of said signals in space from each of the three stations.

17. In a system for providing vehicle navigation information, a signal transmitting system comprising: a plurality of transmitting stations; radiating means for each of said plurality of transmitting stations; a signal generating means at each transmitting station with each of said generating means generating substantially identical signals having mutually coherent components; delay means at each station connected to said signal generating means for providing a plurality of output signals of different delay periods; signal carrier generating means at each station for energizing each said radiating means; and modulation means at each station connecting said each station delay means to each station carrier generating means for modulating each said generation means carrier signal with each of said plurality of output signals provided by each said delay means.

18. A system for providing vehicle navigation and communication information, comprising: a plurality of transmitting stations; radiating means for each of said transmitting stations; first control means at each transmitting station coupled to said radiating means for generating a navigation family of waves representing a plurality of substantially identical mutually coherent signals time displaced from each other; identification code modulating means coupled to said first control means for providing a distinctive identification modulation on each of said plurality of identical signals radiating from each station; second control means at each transmitting station coupled to said radiating means for generating a communications signal at each station; said communications signals being of such a wave shape that $$Na(t)=Nb(t)\times Nc(t)$$

where $Na(t)$ is the communications signal transmitted from one of said transmitting stations, $Nb(t)$ is the communications noise signal transmitted from another of said stations and $Nc(t)$ is the communications signal transmitted from still a different transmitting station; third control means connected to said second control means for selecting the time at which said communications signal is applied to said radiating means at each station; fourth control means coupled to said second control means for message modulating only one of said communications signals; receiver means; a first correlation means in said receiver means; said first correlation means providing comparison of the identical coherent signal from selected ones of each of said station to determine which of said coherent signals most nearly correlate; second correlation means in said receiver means for providing comparison of the communications signal from each of said plurality of transmitting stations to determine whether said communications signals are in phase relationship; first decoding means for identifying the distinctive code modulation of the most nearly correlated identical signal; second decoding means connected to said second correlation means for detecting the message modulation on said one of said communications signal.

19. In a navigation system, the combination of: a plurality of transmitting stations each having radiating means; means at each of said stations for generating a plurality of substantially identical time displaced signals; means for applying a distinctive identifying code to each signal from each of said stations; means for energizing said radiating means of each of said stations with said plurality of distinctively coded signals; receiver means adapted to develop a plurality of individual output signals respectively representing the radiated signals of each of said stations; signal correlation means operatively coupled to said receiver means and responsive to the output signals coupled thereby to provide an output signal representing substantial correlation between a pair of selected ones of the signals radiated from said stations; and means operatively coupled to said receiver means and responsive to said identifying code for identifying said selected ones of said signals.

20. In a navigation system, the combination of: a plurality of spaced apart transmitting stations each having a signal radiating means; signal generating means operatively coupled to each of said signal radiating means for producing the radiation of a respectively different one of a like numbered plurality of composite signals each of said composite signals containing a first signal component which is mutually coherent with and bears a specified fixed timing relationship to a first signal component in each of the other composite signals; means operatively coupled to said signal generating means and to each of said signal radiating means for introducing a distinctively different second signal component into each of said composite signals to identify the station from which each of said composite signals is radiated; receiving means responsive to the signals radiated by said signal radiating means to develop individual output signals each representative of both the first and the second signal components of each received radiated composite signal, respectively; signal correlation means coupled to said receiving means and responsive to at least a pair of said output signals for generating a correlation output signal representative of the correlation between the first signal components of the composite signals radiated from a pair of said signal radiating means; and means coupled to said receiving means responsive to the second signal components represented by said pair of output signals for indicating the identity of the stations from which those first signal components which produce said correlation output signal have originated.

References Cited by the Examiner

UNITED STATES PATENTS 3,153,237 10/1964 Lakatos.
3,212,092 10/1965 Anderson et al.

CHESTER L. JUSTUS, *Primary Examiner.*

W. S. PYLES, H. C. WAMSLEY, M. KRAUS, *Assistant Examiners.*